United States Patent [19]

Kock

[11] 4,355,862
[45] Oct. 26, 1982

[54] OPTICAL FIBRE TERMINATION

[75] Inventor: Konrad Kock, Rödermark, Fed. Rep. of Germany

[73] Assignee: AMP Incorporated, Harrisburg, Pa.

[21] Appl. No.: 181,306

[22] Filed: Aug. 25, 1980

[30] Foreign Application Priority Data

Sep. 1, 1979 [GB] United Kingdom ............... 7930369

[51] Int. Cl.³ .............................................. G02B 5/14
[52] U.S. Cl. ................................................ 350/96.2
[58] Field of Search ............... 350/96.20, 96.21, 96.22

[56] References Cited

U.S. PATENT DOCUMENTS 3,510,641  5/1970  Reynolds .......................... 240/1
3,999,837  12/1976  Bowen et al. ................... 350/96 C
4,127,319  11/1978  Forney, Jr. et al. ............. 350/96.20

OTHER PUBLICATIONS

Plastic Plug and Modified Connector; Electrical Design News; vol. 23, No. 21, Nov. 1978, pp. 67-68.
Fibre-Optic Communications; Engineering vol. 218, No. 11, Nov. 1978, pp. 1180-1182.

Primary Examiner—Eli Lieberman

[57] ABSTRACT

A method of terminating a glass optical fibre (13) by clamping the optical fibre (26) in a passageway in a ferrule (11) with an end portion (26) of the optical fibre core received in a bore in the ferrule end (17) and projecting beyond the ferrule end (17); severing the end portion (26) to provide an optical face at a predetermined distance from the ferrule end (17); and, radially crimping the ferrule (13) to advance the ferrule (11) relative to the optical fibre core (13) to locate the ferrule end (17) flush with the optical face.

3 Claims, 3 Drawing Figures

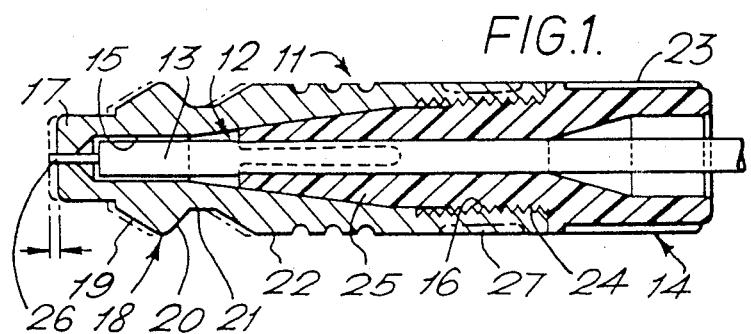
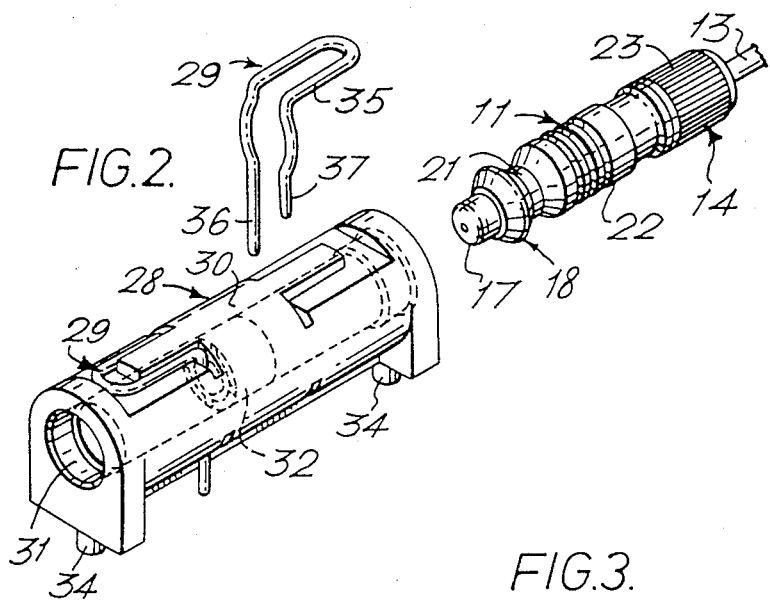
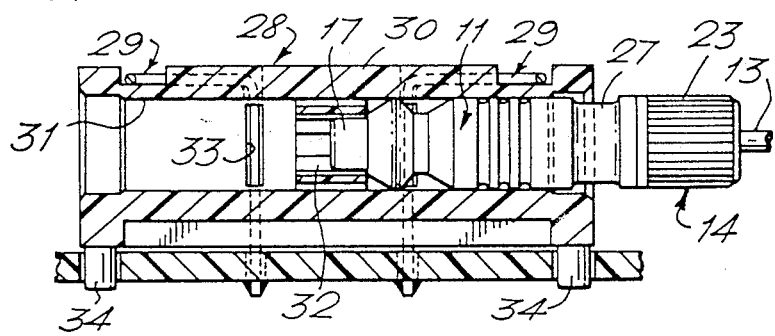

OPTICAL FIBRE TERMINATION

The invention relates to a method of terminating optical fibres having glass optical cores.

Known methods of terminating such optical fibres include the step of optically polishing, by guiding, the end of the glass core flush with a front end of a ferrule in which the optical fibre is mounted. However, not only is the grinding process relatively time consuming but, portions of the ferrule end may also be ground away. When the ferrule is metal, scouring of the optical face of the core by the metal waste may occur resulting in undesirable transmission losses at the face. A generally satisfactory optical face may also be obtained by treaking or shearing the fibre core transverse to the axis. However, mounting the fibre subsequently in the ferrule has also proved time consuming as it is difficult to manipulate the parts to secure the optical fibre in the ferrule with the optical face flush with the ferrule end.

According to the invention an optical fibre is clamped in a passageway in a ferrule with an end portion of the optical core received in a bore in the ferrule end and projecting beyond the ferrule end. The end portion is then broken or sheared to provide an optical face at a predetermined distance from the ferrule end and the ferrule is crimped radially advancing the ferrule relative to the optical core to locate the ferrule end flush with the optical face.

The fibre may be clamped in the passageway by a chuck or collet and complementary external and internal screw threads may be provided on the chuck or collet and the ferrule respectively and the crimping force may be applied around the screw threads.

The invention includes an optical fibre termination made by the above-described method.

A specific example of the invention will now be described with reference to the accompanying drawings, in which:

FIG. 1 is an axial cross-section of an optical fibre termination showing the location of the optical fibre core before and after crimping;

FIG. 2 is a perspective view of the termination and a splice bush exploded apart; and FIG. 3 is an elevational view, partly in cross-section of the termination assembled in a splice bush mounted on a board.

The termination comprises a metal ferrule 11 having an internal passageway 12 in which an optical fibre cable 13 is clamped by a chuck or collet 14. The ferrule passageway tapers towards a front end and communicates with bore 15 receiving the optical fibre core 26 as a close fit. A rear end of the ferrule is provided with an internal screw thread 16. The ferrule is formed at a front end with a cylindrical nose 17 rearwardly of which is an annular rib 18 having forward and rearward ramp surfaces 19 and 20, respectively. A neck 21 is defined between the rearward ramp surface 20 and a body portion 22.

The chuck or collet 14 has a plastics body including a generally cylindrical finger piece 23, an intermediate externally threaded portion 24 and a bifurcated front end defining a pair of jaws 25.

The optical fibre is clamped in the ferrule with the core protruding out of the bore 16 beyond the front end of the ferrule. The end portion is then broken or sheared to provide an optical face at a predetermined distance from the front end of the ferrule (FIG. 1). The rear end of the ferrule body is then radially crimped by a predetermined amount extruding the metal body forwards. However, as the glass core is not compressible no extrusion of the core occurs and the optical face is displaced rearwardly relative to the ferrule during crimping until the optical face is flush with the front end of the ferrule. The location of the crimp 27 and the relative displacement is indicated by the broken lines in FIG. 1.

Optical fibres terminated by the above technique may be connected together in a splice bush 28 by springs 29.

The bush has a generally cylindrical body 30 moulded from plastics material with a cable receiving passageway 31 in which is formed an alignment annulus 32 concentric with the passageway wall and similar in function to that described in our German Patent Application No. 2,912,335.1 (9115). An upper side of the body is formed with U-shaped spring-receiving rebates which extend generally axially of the body and communicate with passageways 33 extending transversely through the body. Mounting feet 34 are located on the underside of the body.

The springs 29 are each of hairpin shape and have a looped portion 35 extending transversely of two of outwardly bowed legs 36 and 37 respectively, one of the legs 36 being longer than the other for receipt in a mounting board.

The bush 28 is mounted on the board by soldering the longer legs 36 into the board with each leg extending through the passageways 33 and the looped portions 35 seated in respective rebates.

The terminations are then pushed into opposite ends of the passageways until the spring legs reside behind the rearward ramp surfaces 20 in a snap action securing the connectors in the bush with their noses 17 located in precise axial alignment by the annulus 32.

What is claimed is:

1. A method of terminating a glass optical fibre by clamping the optical fibre in a passageway in a ferrule with an end portion of the optical fibre core received in a bore in the ferrule end and projecting beyond the ferrule end; severing the end portion to provide an optical face at a predetermined distance from the ferrule end; and, radially crimping the ferrule to advance the ferrule relative to the optical fibre core to locate the ferrule end flush with the optical face.

2. A method according to claim 1 in which the optical fibre is clamped in the passageway by a plastics collet or chuck having external clamping threads co-operating with internal clamping threads on the ferrule and the radial crimping force is applied around the screw threads.

3. An optical fibre termination made by the method of claim 1 or claim 2.

* * * * *